(12) United States Patent  
Ufimtsev et al.

(10) Patent No.: US 8,151,004 B1
(45) Date of Patent: Apr. 3, 2012

(54) FILE PROCESSING TO ACCELERATE IMAGE VIEWER INITIALIZATION

(75) Inventors: Oleksandr Volodymyrovych Ufimtsev, Lviv (UA); Herbert Wolfram, San Rafael, CA (US)

(73) Assignee: Adobe Systems Incorporated, San Jose, CA (US)

( * ) Notice: Subject to any disclaimer, the term of this patent is extended or adjusted under 35 U.S.C. 154(b) by 902 days.

(21) Appl. No.: 11/777,822

(22) Filed: Jul. 13, 2007

(51) Int. Cl.
  *G06F 15/16* (2006.01)
  *G06F 15/177* (2006.01)
(52) U.S. Cl. .......... 709/246; 709/218; 709/221
(58) Field of Classification Search .......... 709/246, 709/218, 221, 228–229
  See application file for complete search history.

(56) References Cited

U.S. PATENT DOCUMENTS

| | | | |
|---|---|---|---|
| 7,206,767 B2 * | 4/2007 | Matsushima et al. | 705/52 |
| 7,415,529 B2 * | 8/2008 | Saunders et al. | 709/231 |
| 2003/0011604 A1 * | 1/2003 | Capers | 345/473 |
| 2003/0208596 A1 * | 11/2003 | Carolan et al. | 709/225 |
| 2006/0008114 A1 * | 1/2006 | Sekiguchi et al. | 382/100 |
| 2006/0085529 A1 * | 4/2006 | Ziegler et al. | 709/223 |
| 2006/0136577 A1 * | 6/2006 | Stern et al. | 709/219 |
| 2006/0294145 A1 * | 12/2006 | Saunders et al. | 707/104.1 |
| 2007/0192324 A1 * | 8/2007 | Pedersen | 707/10 |
| 2008/0070688 A1 * | 3/2008 | Loehrer | 463/42 |
| 2008/0133708 A1 * | 6/2008 | Alvarado et al. | 709/218 |

* cited by examiner

*Primary Examiner* — Patrice Winder
*Assistant Examiner* — Ebrahim Golabbakhsh
(74) *Attorney, Agent, or Firm* — Fish & Richardson P.C.

(57) ABSTRACT

The present disclosure includes systems and methods relating to accelerating initialization of image viewers. In general, one aspect of the subject matter described in this specification can be embodied in a method that includes receiving a request to display an image, identifying a data component involved with displaying the image, modifying an existing electronic binary vector graphics file to include the data component, and transmitting the modified file.

17 Claims, 4 Drawing Sheets

FILE PROCESSING TO ACCELERATE IMAGE VIEWER INITIALIZATION

BACKGROUND

The present disclosure relates to initialization of image viewers, and more specifically to accelerating initialization of image viewers conforming to a binary vector graphics file format, such as Adobe® Flash®-based image viewers. Flash® content is typically delivered as a series of instructions over web protocols in the precisely described proprietary SWF file format. In a typical initialization, a user may indicate a wish to view an image configured for presentation using an Adobe® Flash®-based image viewer, for example, by double-clicking the image from within a web browser client. A communication is then transmitted to a server hosting the image and the image viewer. The server then returns to the client a loader SWF file. A Flash® application executes the loader SWF file, causing the transmission of a second communication to the server. The server then returns to the client a main SWF file, which includes the image viewer application. Execution of the main SWF file causes multiple additional transmissions to the server to request components used in displaying the requested image, for example, skin data, image viewer configuration data, and image information. Image information is typically not cached (i.e., is marked "expire immediately"), and therefore may require an origin server access for each request. After the server has responded to all requests, and all requested components have been received at the client, the image is displayed.

SUMMARY

This specification describes technologies relating to accelerating initialization of image viewers. In general, one aspect of the subject matter described in this specification can be embodied in a method that includes receiving a request to display an image, identifying a data component involved with displaying the image, modifying an existing electronic binary vector graphics file to include the data component, and transmitting the modified file. Another aspect of the subject matter described in this specification can be embodied in a method that includes identifying a first electronic binary vector graphics file associated with an image viewer, parsing the electronic file into several objects, manipulating the objects, and linking the manipulated objects into a second electronic binary vector graphics file. Other embodiments of this aspect include corresponding systems, apparatus, and computer program products.

These and other embodiments can optionally include one or more of the following features. The request may be received from a source device and the modified file may be transmitted to the source device. A first server may receive the request and a second server may transmit the modified file. A first server may receive the request and retrieve an electronic file from a second server. The request may be a Hypertext Transfer Protocol (HTTP) request. The request may be a Hypertext Transfer Protocol over Secure Socket Layer (HTTPS) request. A method may identify and remove from an electronic file a component of an image viewer nonessential for displaying the image. A method may determine and include in an electronic file layout information for displaying the image. A method may mark a modified electronic file as cacheable. A cacheable modified electronic file may be cached on a Content Delivery Network. The binary vector graphics file format may be a SWF file format. Manipulating the objects may involve removing an object, adding an object, and/or modifying an object. An object may conform to a SWF data structure. The SWF data structure may be a SWF tag. A method may replace simple numerical references in an electronic file with direct object references prior to manipulating the objects. A method may provide an electronic file to an application. The application may invoke the image viewer during execution of an electronic file.

Particular embodiments of the subject matter described in this specification can be implemented to realize one or more of the following advantages. Image viewer initialization may be accelerated by reducing the number of required data transmissions between the client and the server. Image viewer initialization may be accelerated by reducing the size of the required data transmissions between the client and the server. Image viewer initialization may be accelerated by making the required data transmissions between the client and the server cacheable. Image viewer initialization may be accelerated by reducing the total number of computations required. Image viewer initialization may be accelerated by transferring computations previously performed at the client to the server.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Retailers, service providers, and other business entities generally seek to advertise their products and services. One method of advertising is to provide images of products and services to potential consumers. For example, if a potential consumer visits the web site of a clothing retailer, the consumer may be presented with a variety of images of dresses, suits, shoes, and other items that the retailer has for sale. Some of these web sites may provide the consumer with a rich media experience, allowing the consumer to select an image for display, zoom in on a particular area of the image, rotate the image, or perform any of a number of other actions related to the image. For example, the consumer may select a particular item of clothing, such as a suit, by double-clicking a thumbnail image of the suit. As a result of selecting the thumbnail image, a larger image of a model wearing the suit may be displayed. The consumer may be able to rotate the image to see the suit from a different angle, zoom in to see the fabric details of the suit, select a different fabric or color, or perform other manipulations of the suit image.

Such rich media experiences may be provided to the user through customized image viewers configured to interact with images such as those described above. The images and image viewers are associated with a number of previously generated configuration files and data files that interact to provide the rich media experience. The customized image viewers are typically adapted to execute on a particular platform. One such platform is the Adobe® Flash® platform. Files containing image viewers adapted to execute on the Adobe® Flash®platform are referred to as SWF files and conform to the SWF binary vector graphics format. Such files normally have the extension .swf. SWF provides a compact, TAG-based, easily extendible format that supports streaming, bitmap and vector graphics, and scripting. SWF player software is available for many platforms and can be adapted to client computer performance and network connection speed. SWF's timely market entry coupled with its graphics and development software support made it popular among web designers and, later, web developers.

Image viewers adapted to execute on a particular platform are generally launched by applications associated with the particular platform. For example, an Adobe® Flash®-based image viewer must generally be launched by an Adobe® Flash® player. Once the platform application launches the image viewer, the image viewer may interact with the image and its associated files to provide the rich media experience.

Before an image configured for presentation using an image viewer can be displayed at a client, the image viewer may require downloading from a server and may also require initialization. Image viewers are typically web clients adapted for image viewing and may support basic features, such as zooming and panning, and may also support more advanced features, such as swatching, spinning, automatic stage layout, and image maps.

Figure 1:
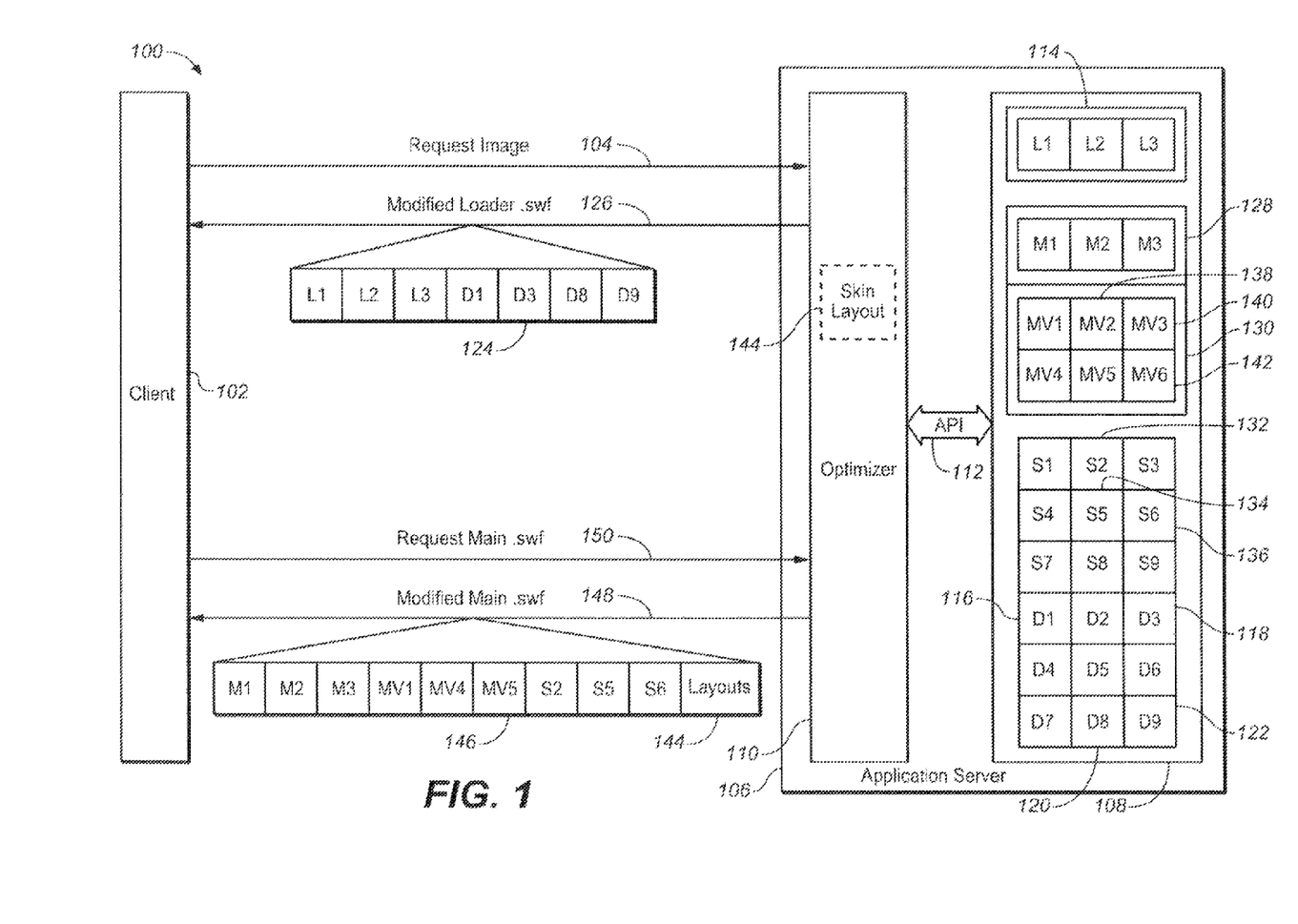
FIG. 1 is a block diagram illustrating an example system for downloading and initializing an image viewer.

FIG. 1 illustrates an example system 100 for downloading and initializing a Flash® image viewer. Client 102 may transmit request 104 to application server 106, for example, in response to an indication that the user wishes to view an image configured for presentation using a Flash® image viewer. Application server 106 may include an image serving component 108 and may also include an optimizer module 110. In some implementations not illustrated in example system 100, image serving component 108 and optimizer module 110 may be located on different servers. Image serving component 108 may be configured to respond to communications from client 102, such as request 104 to view an image configured for presentation using a Flash® image viewer, and may be configured to provide the image viewer itself, image viewer configuration data, image data, image information, and other components associated with displaying the requested image. In some implementations, client 102 and image serving component 108 may communicate through a portal device, such as, for example, a web portal. Optimizer module 110 may be configured to intercept communications from client 102, such as request 104, and may be configured to provide an improved response to such communications. In some implementations, client 102 and optimizer module 110 may communicate through a portal device, such as, for example, a web portal. Optimizer module 110 may not necessarily provide an optimal or best response, but may be adapted to produce an improved response or improved performance such as described herein. Optimizer module 110 may be a Java application or other suitable application and may communicate with image serving component 108 through Application Programming Interface (API) 112. In some implementations not illustrated in example system 100, optimizer module 110 may employ a different method of communication with image serving component 108, such as, for example, Hypertext Transfer Protocol (HTTP).

In some implementations, request 104 is an HTTP request for a SWF file associated with the Flash® image viewer. SWF is a precisely described proprietary file format developed for Flash® applications. Flash® content is typically delivered as a series of instructions over web protocols in SWF file format. The SWF files are typically hosted on a server and then downloaded to, and displayed on, the requesting client. SWF files consist of multimedia content, such as vectors, bitmaps, sound, and video, as well as instructions. In addition to specifying a SWF file, request 104 may contain one or more Flash® image viewer commands. These commands may contain information about the requested image and how it should be displayed.

Request 104 may be received by optimizer module 110. Optimizer module 110 may identify the components required to view the requested image, for example, a Flash® image viewer configured to display the requested image, skin data, image configuration data, image viewer configuration data, image data, and other components, by inspecting the contents of request 104. Skins are used to customize the look and feel of the image viewer. A skin may contain image viewer components configuration information and may also contain internationalization resources, such as a preferred language. A skin may define the overall appearance of the image viewer, may position or remove user interface elements, and may define detailed resizing behaviors. For example, the image viewer configuration data may determine whether the image can be zoomed, and if so, the skin data may determine where and how the zoom button is displayed. Skin data may also determine the appearance and position of a model or the background scenery associated with the image. For example, the same model standing in the same position on a beach may be displayed wearing a variety of clothing articles. One selectable image may show the model in a pair of white shorts and a tank top, while another selectable image may show the model in a yellow sundress. In this example the shorts, tank top, and sundress represent image data, white and yellow represent image configuration data, and the model, the model's position, and the beach represent skin data.

Optimizer module 110 may identify the components required to view the requested image by opening and inspecting the contents of a file associated with request 104, such as, for example, a SWF file associated with request 104. Some of the identified components may be unique to the requested image, for example, the initial image data or the image configuration data. Such unique components are referred to herein as dynamic data components. Some of the identified components may be common to many images related to the requested image, for example, the skin data or the image viewer configuration data. Such common components are referred to herein as static data components.

Optimizer module 110 may open, inspect, and modify the contents of a SWF file using any of a number of available SWF editing tools, such as the Flagstone Transform SWF open-source library. Using a SWF editing tool, optimizer module 110 may embed into a SWF file one or more identified components required to view the requested image. In some implementations, optimizer module 110 may embed dynamic data components into a loader SWF file. For example, in system 100, after receiving request 104, optimizer module 110 may identify loader SWF 114, dynamic data component D1 116, dynamic data component D3 118, dynamic data component D8 120, and dynamic data component D9 122 as components required to view the requested image. Optimizer module 110 may then retrieve identified loader SWF 114 and dynamic data components D1 116, D3 118, D8 120, and D9 122 from image serving component 108 using API 112 to communicate with image serving component 108. In some implementations not illustrated in example system 100, optimizer module 110 may retrieve identified dynamic data components from a different server and/or may identify and retrieve other components instead of or in addition to the identified dynamic data components. Optimizer module 110 may then modify loader SWF 114 to include dynamic data components D1 116, D3 118, D8 120, and D9 122, resulting in modified loader SWF 124. Optimizer module 110 may then transmit modified loader SWF 124 to client 102 in communication 126. In some implementations, a Flash® application at client 102 may execute modified loader SWF 124, which may cause the transmission of request 150 for a main SWF file to server 106.

In some implementations, optimizer module 110 may embed static data components into a main SWF file. For example, in system 100, after receiving request 104, optimizer module 110 may identify main SWF 128 (which includes image viewer 130), static data component S2 132, static data component S5 134, and static data component S6 136 as components required to view the requested image. Optimizer module 110 may then retrieve identified main SWF 128 and static data components S2 132, S5 134, and S6 136 from image serving component 108 using API 112 to communicate with image serving component 108. In some implementations not illustrated in example system 100, optimizer module 110 may retrieve identified static data components from a different server and/or may identify and retrieve other components instead of or in addition to the identified static data components. Optimizer module 110 may then modify main SWF 128 to include static data components S2 132, S5 134, and S6 136.

In some implementations, optimizer module 110 may identify one or more required components not essential for viewing the requested image. Using an SWF editing tool, optimizer module 110 may remove one or more identified components from a SWF file. For example, optimizer module 110 may determine that, for example, the spin feature of the required Flash® image viewer is not required to display the requested image. In system 100, after receiving request 104, optimizer module 110 may determine that components MV2 138, MV3 140, and MV6 142 are nonessential features of Flash® image viewer 130, i.e., components MV2 138, MV3 140, and MV6 142 are not required to display the requested image. Optimizer module 110 may then modify main SWF 128 to remove identified nonessential components MV2 138, MV3 140, and MV6 142.

In some implementations, optimizer module 110 may identify computations required to view the requested image such as, for example, computations for updating the user interface layout based on the stage size and/or skin layout information. Optimizer module 110 may identify these user interface layout and skin layout computations by inspecting the contents of request 104 and/or by inspecting the contents of a file associated with request 104. For example, request 104 may indicate that the requested image should be initially displayed in a particular size. Optimizer module 110 may perform the computations to determine layouts 144. Optimizer module 110 may then modify main SWF 128 to include layouts 144.

In example system 100, after modifying main SWF 128 resulting in modified main SWF 146, optimizer module 110 may then transmit modified main SWF 146 to client 102 in communication 148. Although example system 100 shows communication 148 in response to communication 150, other configurations are possible. For example, optimizer module 110 may transmit communication 148 after transmitting communication 126 in response to request 104. In another example, modified loader SWF 124 and modified main SWF 146 may be transmitted in a single communication from optimizer module 110. Although example system 100 illustrates a system adapted for the Adobe® Flash® platform, other systems adapted for other binary vector graphics platforms are possible.

Figure 2:
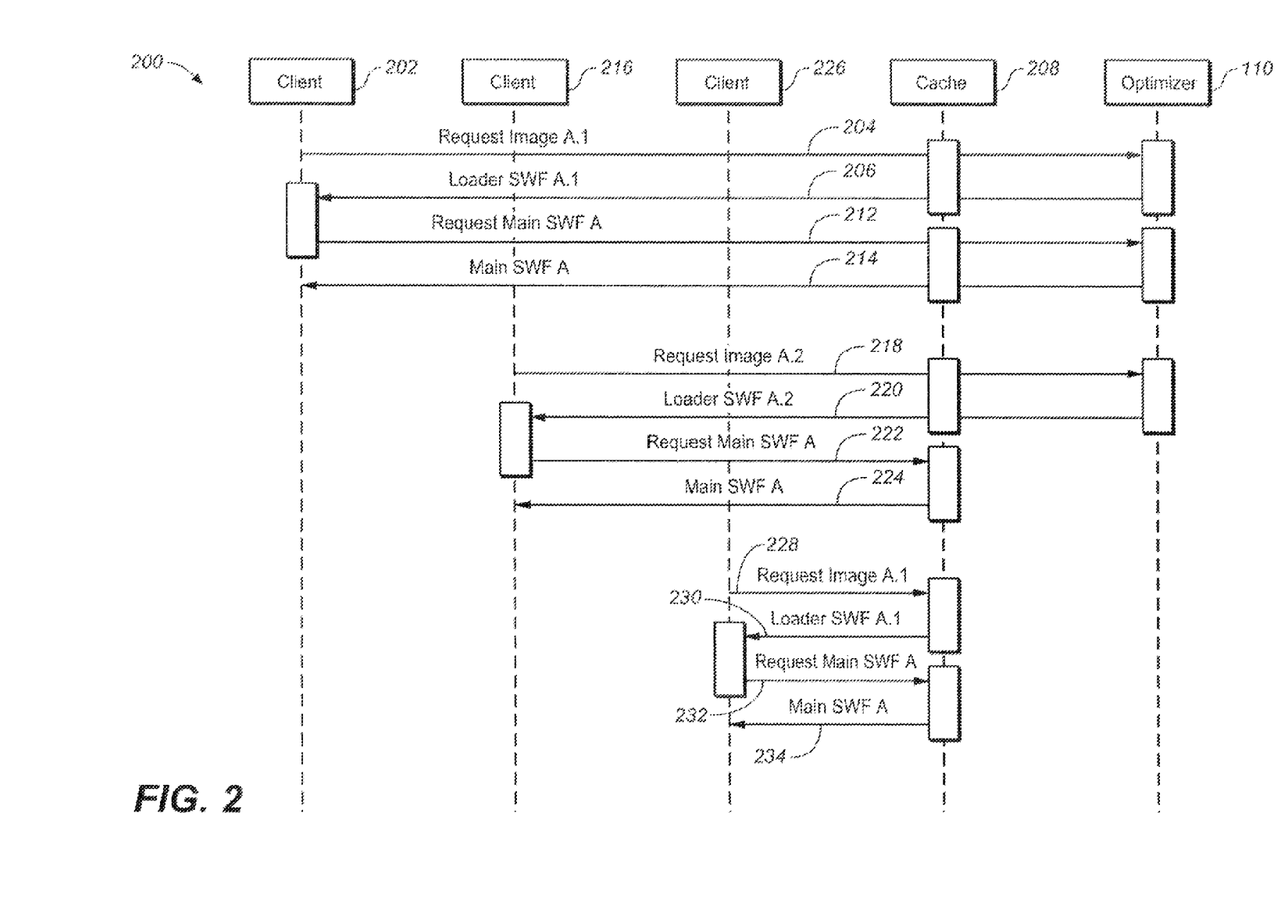
FIG. 2 is a sequence diagram illustrating an example process for downloading and initializing image viewers.

FIG. 2 is a sequence diagram illustrating example process 200 for downloading and initializing Flash® image viewers. In process 200, client 202 may transmit to a server a request 204 for an image A.1, for example, in response to an indication that a user wishes to view an image A.1 configured for presentation using a Flash® image viewer. Image A.1 may be a particular image from a class A of related images. Optimizer module 110, located within the server, may receive request 204, may identify a loader SWF and dynamic components required to view image A.1 as described in FIG. 1, may modify the loader SWF as described in FIG. 1, may mark the modified loader SWF as cacheable, and may transmit the modified loader SWF to client 202 in return communication 206. As communications 204 and 206 travel between client 202 and optimizer module 110 on the server, for example, across a network such as the Internet, cache 208 may capture the communications, recognize that they are cacheable, and store them. Cache 208 may reside in the client application, between the client and the server as part of a proxy, directly in front of a server, or, in some implementations, as a module of a server.

Cache 208 may be a Content Delivery Network (CDN). A CDN is a system of computers networked together across the Internet that cooperate transparently to deliver cached content to end users. CDN nodes are deployed in multiple locations, often over multiple backbones. These nodes cooperate with each other to satisfy requests for content by end users, potentially reducing bandwidth costs and/or improving end-user performance. Example CDNs include Akamai and Mirror Image.

As shown in FIG. 2, a Flash® application at client 202 may execute the received modified loader SWF, which may cause client 202 to transmit to the server a request 212 for a main SWF A associated with viewing images of class A, including requested image A.1. Optimizer module 110 may receive request 212, may identify main SWF A and other static components required to view images of class A (as described in connection with FIG. 1), may identify nonessential components of main SWF A (as described in connection with FIG. 1), and may perform computations associated with viewing images of class A. Optimizer module 110 may then modify the main SWF, may mark the modified main SWF as cacheable, and may transmit the modified main SWF to client 202 in return communication 214, resulting in the eventual display of image A.1 at client 202. As communications 212 and 214 travel between client 202 and optimizer module 110 on the server, cache 208 may capture the communications, recognize that they are cacheable, and store them.

Client 216 may then transmit to the server a request 218 for an image A.2, for example, in response to an indication that a user wishes to view an image A.2 configured for presentation using a Flash® image viewer. Image A.2, like image A.1, may be a particular image from a class A of related images. Optimizer module 110, located within the server, may receive request 218, may identify a loader SWF and other dynamic components required to view image A.2, may modify the loader SWF, may mark the modified loader SWF as cacheable, and may transmit the modified loader SWF to client 216 in return communication 220. As communications 218 and 220 travel between client 216 and optimizer module 110 on the server, cache 208 may capture the communications, recognize that they are cacheable, and store them.

In some implementations, a Flash® application at client 216 may execute the received modified loader SWF, which may cause client 216 to transmit to the server a request 222 for a main SWF A associated with viewing images of class A, including requested image A.2. Cache 208 may recognize communication 222 as similar to communication 212 sent previously by client 202 in conjunction with request 204 to view image A.1. Cache 208 may then transmit in return communication 224 to client 216 the modified main SWF generated by optimizer module 110 in response to previously received communication 212, resulting in the eventual display of image A.2 at client 216. As communication 218 travels from client 216 to optimizer module 110 on the server and back, cache 208 may capture the communication and store it.

Client 226 may then transmit to the server a request 228 for image A.1, for example, in response to an indication that a user wishes to view an image A.1 configured for presentation using a Flash® image viewer. Cache 208 may recognize request 228 as similar to request 204 to view image A.1 sent previously by client 202. Cache 208 may then transmit in return communication 230 to client 226 the modified loader SWF generated by optimizer module 110 in response to previously received request 204. In some implementations, a Flash® application at client 226 may execute the received modified loader SWF, which may cause client 226 to transmit to the server a request 232 for a main SWF A associated with viewing images of class A, including requested image A.1. Cache 208 may recognize communication 232 as similar to communication 212 sent previously by client 202 in conjunction with request 204 to view image A.1. Cache 208 may then transmit in return communication 234 to client 226 the modified main SWF generated by optimizer module 110 in response to previously received communication 212, resulting in the eventual display of image A.1 at client 226. Although example process 200 illustrates a process adapted for the Adobe® Flash® platform, other processes adapted for other binary vector graphics platforms are possible.

Figure 3:
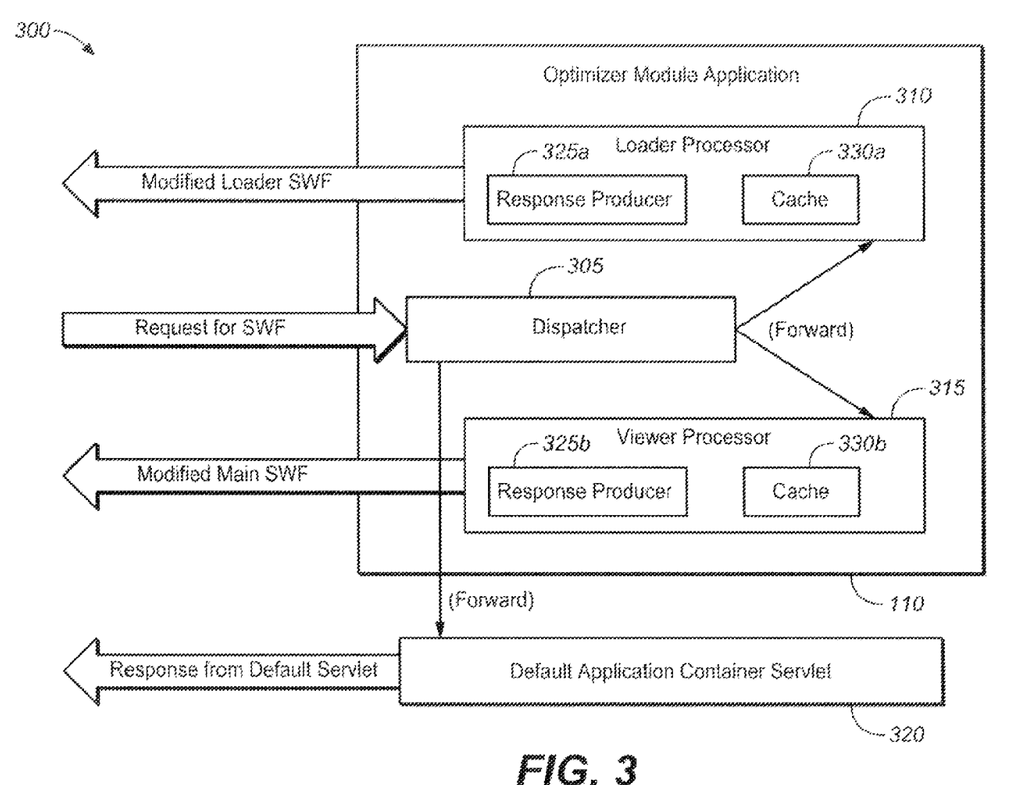
FIG. 3 is a diagram illustrating an example incoming request process for an optimizer module.

FIG. 3 is a diagram illustrating an example incoming request process 300 for optimizer module 110. In some implementations, optimizer module 110 may consist of at least four parts: an initializer (not shown), a dispatcher servlet 305, a loader processor worker servlet 310, and a viewer processor worker servlet 315. The initializer may be a context listener and may be executed at startup for reading configuration information and setting up application-wide global objects. Dispatcher servlet 305 may be the entry point for incoming requests. Dispatcher servlet 305 may be responsible for forwarding incoming requests to a worker servlet 310 or 315 or to default application container servlet 320. Dispatcher servlet 305 may receive all requests for SWF files and may forward those requests that do not require server-side SWF processing to default application container servlet 320.

Loader processor worker servlet 310 may modify a loader SWF. In some implementations, loader processor worker servlet 310 may modify a loader SWF by embedding configuration, loading animation, image information, and other data into the loader SWF. Viewer processor worker servlet 315 may modify a main SWF. In some implementations, viewer processor worker servlet 315 may modify a main SWF by embedding skins and other custom user interface elements or by removing nonessential components, such as nonessential viewer components. Viewer processor worker servlet 315 may also perform computations required to view the requested image such as, for example, computations for updating the user interface layout based on the stage size and/or skin layout information. Loader processor worker servlet 310 and viewer processor worker servlet 315 may perform actual processing of original SWF files and return modified SWF files back to the client. Worker servlet 310 may include disk/memory cache 330a and response producer 325a. Worker servlet 315 may include disk/memory cache 330b and response producer 325b. Caches 330a and 330b may be a single cache shared by worker servlets 310 and 315 and may store previously generated responses on the disk. Worker servlet 310 and worker servlet 315 may share the same architecture and may differ only in configuration, and their respective caches and response producers are collectively referred to herein with reference numerals 330 (cache) and 325 (response producer).

Response producer 325 may generate modified SWF files and may validate existing modified SWF files stored in cache 330. Response producer 325 may keep information about external dependencies requested during response validation and/or generation. Response production may be divided into multiple primitive artifacts, and the entire response production may be represented as a chain of elementary executions of many simple artifacts. Artifacts may be initially registered in response producer 325 and may not be directly connected to other artifacts. Response producer 325 may create a framework which may allow one artifact to review results of another artifact or of an external resource. Results of each execution of each artifact may be stored and made available to other artifacts. Artifact examples include the original loader SWF, image viewer configuration, image information, and skin files.

In a simplified example, response producer 325 may be a concrete java class labeled "Producer." Artifacts may be represented by a java interface labeled "Artifact." Every specific artifact may be a concrete class implementing the "Artifact" interface, such as class SourceSWFArtifact, ViewerConfigArtifact, SkinArtifact, and/or MainSWFArtifact. Inside class "Producer," artifacts interact with each other using artifact identifiers. Each artifact may optionally locate the resource for which it is responsible and may also produce a result. For example, the image viewer configuration artifact may locate the remote viewer configuration stored on the server, and may also load and parse XML text into appropriate java configuration objects.

Two layers of SWF processing libraries may be used in SWF modification procedures such as, for example, decompiling, decomposing, modifying SWF tags, linking, and compiling back into SWF format. In the first layer, SWF modification procedures may involve parsing the original SWF into a set of Java objects. Each Java object may correspond to a specific SWF tag or other SWF data structure. Parsing may be accomplished with an open-source and/or commercially available SWF tool such as the Flagstone Transform SWF open-source library. In the second layer, SWF modification procedures may involve a linking mechanism that may replace existing name or numerical references in the SWF file with in-memory object references between different SWF tags and data, resulting in a SWF file with a flexible in-memory structure with an application programming interface that may allow the addition, removal, or modification of SWF file content. The linking mechanism may then re-link the SWF tags and may ensure that object identifiers and symbols references are valid throughout the modified SWF file. Although example process 300 illustrates a process adapted for the Adobe® Flash® platform, other processes adapted for other binary vector graphics platforms are possible.

Figure 4:
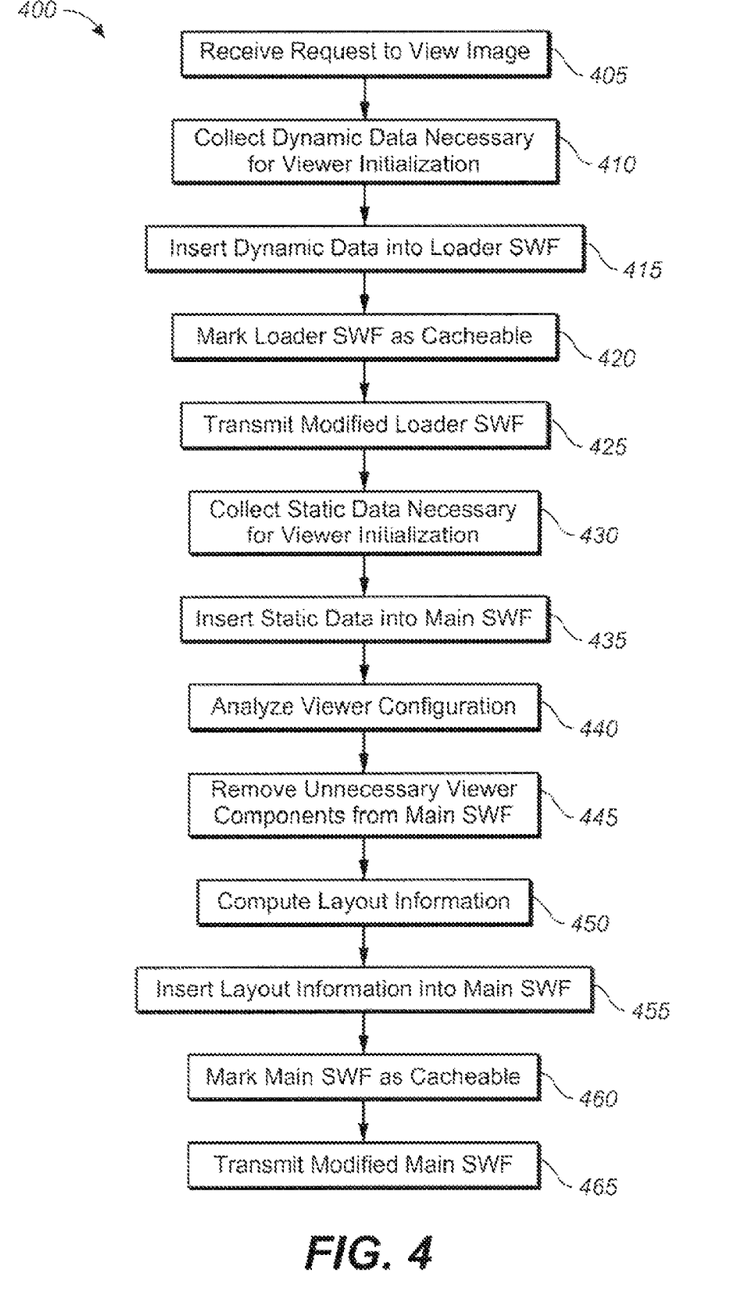
FIG. 4 is a flow diagram illustrating an example process for downloading and initializing an image viewer.

FIG. 4 is a flow diagram illustrating an example process 400 for downloading and initializing a Flash® image viewer. In example process 400, an optimizer module may receive 405 a request associated with a SWF file. The request may be a request to view an image or any other request associated with a SWF file. The optimizer module may then determine that the SWF file associated with the received request should be modified. One example of such a SWF file that should be modified is a SWF file associated with the initialization of an image viewer. If the optimizer module determines that the SWF file should not be modified, then the optimizer may forward the request to another application for processing.

If the optimizer module determines that the SWF file is associated with initialization of the image viewer and should be modified, the optimizer module may collect 410 dynamic data components, such as image data and/or image configuration data, necessary for initialization of the image viewer. For example, the optimizer module may retrieve a dynamic data component from an image serving component within the same server as the optimizer module. In some implementations, the optimizer module may retrieve a dynamic data component from a remote server.

The optimizer module may insert 415 the collected dynamic data components into a loader SWF associated with initializing the image viewer, mark 420 the modified loader SWF as cacheable, and transmit 425 the modified loader SWF. In some implementations, the optimizer module may transmit the modified loader SWF to a client in communication with the optimizer module, and a Flash® application at the client may execute the modified loader SWF, which may cause the client to transmit to the server a request for a main SWF.

The optimizer module may collect 430 static data components, such as skin data and/or image viewer configuration data, necessary for initialization of the image viewer. For example, the optimizer module may retrieve a static data component from an image serving component within the same server as the optimizer module. In some implementations, the optimizer module may retrieve a static data component from a remote server.

The optimizer module may insert 435 the collected static data components into a main SWF associated with initializing the image viewer. In some implementations, the main SWF includes the image viewer. The optimizer module may analyze 440 the image viewer configuration to determine whether the image viewer contains features not required for initialization and eventual display of the requested image, and may remove 445 any identified features from the main SWF. The optimizer module may compute 450 layout information associated with initializing the image viewer, such as user interface layouts based on the stage size and/or skin layouts, and may insert 455 the computed layout information into the main SWF.

The optimizer module may mark 460 the modified main SWF as cacheable, and transmit 465 the modified main SWF. In some implementations, the optimizer module may transmit the modified main SWF to a client in communication with the optimizer module. Although example process 400 illustrates a process adapted for the Adobe® Flash® platform, other processes adapted for other binary vector graphics platforms are possible.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   receiving a request to retrieve an existing electronic file for displaying an image on a client device, the existing electronic file conforming to a file format for presenting multimedia content using content player software on the client device;
   analyzing at least one of the request or the existing electronic file to:
   identify at least one data component necessary to display the image, the at least one identified data component providing data for use by the content player software, in combination with the existing electronic file, to generate the image, wherein the at least one identified data component includes at least one of skin data or image viewer configuration data;
   modifying the electronic file to include the at least one identified data component; and
   transmitting the modified electronic file to the client device in response to the request.

2. The method of claim 1, wherein the electronic file comprises a main file for displaying the image, the method further comprising:
   identifying, based upon the request or upon contents of the electronic file, at least one component of the image viewer nonessential for displaying the image; and
   modifying the electronic file to remove the at least one nonessential component.

3. The method of claim 1, further comprising:
   determining, based upon the request or upon contents of the electronic file, layout information associated with displaying the image;
   performing one or more computations to determine layout data based on the layout information; and
   modifying the electronic file to include the layout data.

4. The method of claim 1, further comprising:
   marking the modified electronic file as cacheable; and
   caching the modified electronic file on a Content Delivery Network (CDN).

5. The method of claim 1, wherein the extendible file format comprises a small web format (SWF) file format.

6. A system comprising:
   a portal device configured to enable communication between one or more clients and one or more computers through a data communication network; and
   one or more computers operable to communicate through the portal device and to:
   receive a request through the portal device for displaying an image on a client device,
   identify an existing electronic file associated with the request, the electronic file associated with an image viewer conforming to a file format for presenting multimedia content using content player software on the client device,
   analyze at least one of the request or the existing electronic file to identify at least one data component necessary to display the image, the at least one identified data component providing data for use by the image viewer, in combination with the existing electronic file, to generate the image, wherein the at least one identified data component includes at least one of skin data or image viewer configuration data,
   modify the electronic file to include the at least one identified data component, and
   transmit the modified electronic file through the portal device to the client device in response to the request.

7. The system of claim 6, wherein the one or more computers comprise one or more servers, and wherein:
   a dispatcher server is configured to receive the request and to dispatch the request to one or more processing servers, and
   a processing server is configured to analyze at least one of the request or the existing electronic file, modify the electronic file, and transmit the electronic file in response to the request to either the dispatcher server or the client device.

8. The system of claim 6, wherein the extendible file format comprises a small web format (SWF) file format.

9. The method of claim 1, wherein:
   the electronic file includes a loader for loading a main file for displaying the image, and the at least one identified data component includes one or more components unique to the image.

10. The method of claim 9, wherein the at least one identified data component includes at least one of image data or image configuration data.

11. The method of claim 1, wherein:
   the electronic file includes a main file for displaying the image, and
   the at least one identified data component comprises one or more components for use with a plurality of images.

12. The system of claim 7, wherein:
   the electronic file includes an image viewer for displaying the image,
   the processing server includes a viewer processor server configured to modify the image viewer, and
   the at least one identified data component includes one or more components for use with a plurality of images.

13. The system of claim 12, wherein the viewer processor server is further operable to:
   identify, based upon the request or upon the contents of the electronic file, at least one component of the image viewer nonessential for displaying the image; and
   modify the electronic file to remove the at least one nonessential component.

14. The system of claim 12, wherein the viewer processor server is further operable to:
   determine, based upon the request or upon contents of the electronic file, layout information associated with displaying the image; and
   perform one or more computations to determine layout data based on the layout information; and
   modify the electronic file to include the layout data.

15. The system of claim 7, wherein:
   the electronic file includes a loader for loading a main file for displaying the image,
   the processing server includes a loader processor server configured to modify the loader, and
   the at least one identified data component includes one or more components unique to the image.

16. The system of claim 15, wherein the at least one identified data component includes at least one of image data or image configuration data.

17. The system of claim 6, further comprising a cache accessible by the one or more computers, wherein the one or more computers are further operable to:
   mark the modified electronic file as cacheable, and
   store the modified electronic file in the cache.

* * * * *

UNITED STATES PATENT AND TRADEMARK OFFICE
CERTIFICATE OF CORRECTION

PATENT NO. : 8,151,004 B1
APPLICATION NO. : 11/777822
DATED : April 3, 2012
INVENTOR(S) : Oleksandr Volodymyrovych Ufimtsev Page 1 of 1

It is certified that error appears in the above-identified patent and that said Letters Patent is hereby corrected as shown below:

Title Page; item (74); Column 2, (Attorney, Agent, or Firm), Delete "Fish & Richarson P.C." and insert -- Fish & Richardson P.C. --, therefor.

Signed and Sealed this
Fourth Day of September, 2012

David J. Kappos
*Director of the United States Patent and Trademark Office*